(12) United States Patent
Kim et al.

(10) Patent No.: US 11,178,573 B2
(45) Date of Patent: Nov. 16, 2021

(54) METHOD FOR LOAD MANAGEMENT OF BASE STATION AND APPARATUSES THEREOF

(71) Applicant: KT CORPORATION, Gyeonggi-do (KR)

(72) Inventors: Hasung Kim, Seoul (KR); Hyung-joon Song, Seoul (KR); Sung-Yeop Pyun, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/528,980

(22) Filed: Aug. 1, 2019

(65) Prior Publication Data

US 2020/0045583 A1    Feb. 6, 2020

(30) Foreign Application Priority Data

Aug. 1, 2018 (KR) .................. 10-2018-0090004
Jun. 25, 2019 (KR) .................. 10-2019-0075402

(51) Int. Cl.
*H04W 28/08* (2009.01)
*H04W 76/15* (2018.01)
*H04W 88/08* (2009.01)
*H04W 84/04* (2009.01)

(52) U.S. Cl.
CPC ........... *H04W 28/08* (2013.01); *H04W 76/15* (2018.02); *H04W 84/042* (2013.01); *H04W 88/08* (2013.01)

(58) Field of Classification Search
CPC ..... H04W 28/08; H04W 76/15; H04W 88/08; H04W 84/042; H04W 28/0247; H04W 92/20
See application file for complete search history.

(56) References Cited

U.S. PATENT DOCUMENTS

| 2014/0349704 A1* | 11/2014 | Xiao | H04W 16/08 455/525 |
| 2015/0078168 A1* | 3/2015 | Lee | H04W 28/08 370/235 |
| 2016/0127243 A1* | 5/2016 | Hwang | H04L 1/1621 370/235 |
| 2016/0286429 A1 | 9/2016 | Chen | |
| 2018/0049186 A1 | 2/2018 | Hong et al. | |
| 2019/0387444 A1* | 12/2019 | Byun | H04W 36/023 |

(Continued)

FOREIGN PATENT DOCUMENTS

| EP | 3070990 A1 | 9/2016 |
| KR | 10-2015-0031067 A | 3/2015 |

(Continued)

*Primary Examiner* — Dady Chery
(74) *Attorney, Agent, or Firm* — IP Legal Services, LLC

(57) ABSTRACT

Provided are apparatuses and methods of managing a load of a base station node in fifth generation (5G) networks. The method of a master base station for managing a load of a secondary base station may include establishing dual connectivity with the secondary base station, receiving a secondary base station status indication message from the secondary base station through an X2 interface, and determining whether to apply an action for reducing a load of the secondary base station based on a value of a secondary base station load information parameter included in the secondary base station status indication message.

8 Claims, 21 Drawing Sheets

(56) References Cited

U.S. PATENT DOCUMENTS

2020/0045583 A1  2/2020  Kim et al.
2020/0084661 A1  3/2020  Hannu et al.

FOREIGN PATENT DOCUMENTS

| KR | 10-2016-0052422 A | 5/2016 |
| KR | 10-2016-0110889 A | 9/2016 |
| KR | 10-2020-0014687 A | 2/2020 |

\* cited by examiner

METHOD FOR LOAD MANAGEMENT OF BASE STATION AND APPARATUSES THEREOF

CROSS-REFERENCE TO RELATED APPLICATION

This application claims the priority benefit of Korean Patent Application No. 10-2018-0090004, filed on Aug. 1, 2018 and No. 10-2019-0075402, filed on Jun. 25, 2019 in the Korean Intellectual Property Office, the disclosures of which are incorporated herein by reference in their entirety.

BACKGROUND

1. Technical Field

The present disclosure relates to apparatuses and methods of managing a load of a base station node in fifth generation (5G) networks.

2. Description of the Related Art

Studies on next generation mobile communication technologies have been in progress for meeting demands for processing a large amount of data at a high-speed. For example, mobile communication systems have developed by employing technologies related to the 3rd generation partnership project (3GPP), such as Long Term Evolution (LTE), LTE-Advanced, 5G, or the like. Such mobile communication systems have been designed to satisfy a demand for transmitting and receiving a large amount of various data, such as video data, radio data, or the like, at a high speed.

In order to meet such a demand, it is also required to develop a technology for enabling a device (hereinafter, unless specified otherwise, referred to as "user equipment" or "UE") and a base station to transmit and receive data using a plurality of carriers. For example, a carrier aggregation technique has been introduced for enabling one base station to perform communication with a UE by aggregating a plurality of carriers. Further, a dual connectivity technology has been introduced for enabling a plurality of base stations to communicate with a UE using a plurality of carriers.

Even though next generation wireless access technologies have been developed, it is expected to take a certain period of time for providing communication services by using only base stations employing the next generation wireless access technologies. Therefore, it is necessary to provide a communication service using the carrier aggregation or dual connectivity through a network formed of i) LTE base stations using typical radio access technologies and ii) NR base stations using next generation radio access technologies.

Since data usage of UEs has been rapidly increased, it is necessary to develop technologies for managing a load of a base station. In particular, when base stations use heterogeneous radio access technologies or when a single base station transmits data using a plurality of cells, it is required to accurately recognize a status of each base station (e.g., cell) and manage a load of each base station (e.g., cell).

SUMMARY

To address such issues, in accordance with embodiments of the present disclosure, a method and an apparatus are provided for managing a load of each base station in case a UE is configured for dual connectivity with different base stations.

Further, in accordance with embodiments of the present disclosure, a method and an apparatus are provided for managing a load of each node in case a plurality of logical nodes is configured for a base station.

In accordance with one aspect of the present disclosure, a method of a master base station is provided for managing a load of a secondary base station, the method comprising: establishing dual connectivity with the secondary base station, receiving a secondary base station status indication message from the secondary base station through an X2 interface, and determining whether to apply an action for reducing a load of the secondary base station based on a value of a secondary base station load information parameter included in the secondary base station status indication message.

In accordance with another aspect of the present disclosure, a master base station is provided that manages a load of a secondary base station, the master base station comprising: a controller establishing dual connectivity with the secondary base station, and a receiver receiving a secondary base station status indication message from the secondary base station through an X2 interface, the controller determining whether to apply an action for reducing a load of the secondary base station based on a value of a secondary base station load information parameter included in the secondary base station status indication message.

In accordance with further another aspect of the present disclosure, a method of a central unit is provided for managing a load of a distributed unit, the method comprising: receiving a distributed unit status indication message from the distributed unit through an F1 interface, and determining whether to apply an action for reducing a load of the distributed unit based on a value of a distributed unit load information parameter included in the distributed unit status indication message.

In accordance with yet another aspect of the present disclosure, a central unit is provided that manages a load of a distributed unit, the central unit comprising: a receiver receiving a distributed unit status indication message from the distributed unit through an F1 interface, and a controller determining whether to apply an action for reducing a load of the distributed unit based on a value of a distributed unit load information parameter included in the distributed unit status indication message.

In accordance with embodiments of the present disclosure, in case dual connectivity is configured for a UE with different base stations, it is possible to manage efficiently a load of each base station.

Further, in accordance with embodiments of the present disclosure, in case a plurality of logical nodes is configured for a base station, it is possible to efficiently manage a load of each node.

DETAILED DESCRIPTION

Figure 1:
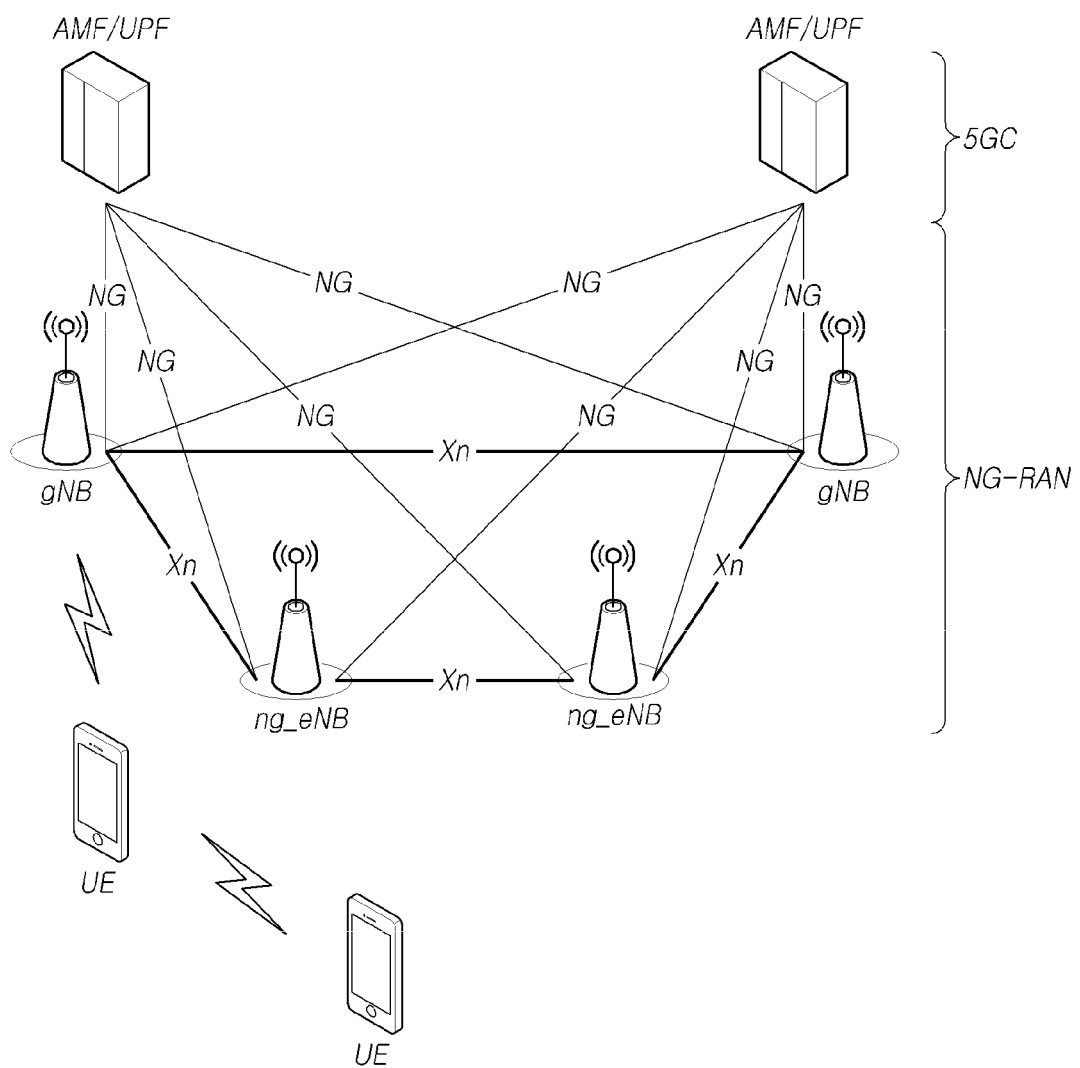
FIG. 1 is a diagram schematically illustrating a structure of a NR wireless communication system where embodiments of the present disclosure may be applied.

Hereinafter, the present preferred embodiments of the disclosure will be described in detail with reference to the accompanying drawings. In adding reference numerals to elements in each drawing, the same elements will be designated by the same reference numerals, if possible, although they are shown in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication service, a packet data service, etc. The wireless communication system includes a user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be referred as two terms. 1) The base station may be referred to an apparatus that forms a corresponding communication service area, such as a megacell, a macrocell, a microcell, a picocell, a femtocell, and a small cell, and provides a communication service within the service area, or 2) the base station may be referred to a communication service area. In the case of 1), the base station may be referred to i) apparatuses that are controlled by the same entity to form and provide any corresponding communication service area, or ii) apparatus that interact and cooperate with each other for forming and providing the corresponding communication service area. According to communication schemes employed by a base station, the base station may be referred to as a point, a transmission/reception point, a transmission point, a reception point, or the like. In case of 2), the base station may be a communication service area itself where UEs are able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station of the present disclosure are entities of performing uplink and downlink communications used to embody the technology and technical conceptions described in the present disclosure. The UE and the base station are defined as a generic term and not limited to a specific term or word.

Herein, the uplink (hereinafter, referred to as "UL") refers to data transmission/reception by a UE to/from a base station, and the downlink (hereinafter, referred to as "DL") refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE and a receiver may be a part of multiple transmission/reception points.

Hereinafter, transmission and reception of a signal through a channel such as the PUCCH, the PUSCH, the PDCCH, or the PDSCH, may be described as the transmission and reception of the channel, such as the PUCCH, the PUSCH, the PDCCH, or the PDSCH.

Meanwhile, higher layer signaling herein includes radio resource control (RRC) signaling for transmitting RRC information that contains an RRC parameter.

The base station performs DL transmission to UEs. The base station may transmit a physical DL control channel for transmitting i) DL control information, such as scheduling information required to receive a DL data channel (e.g., a primary physical channel for unicast transmission), and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be applicable to resource allocation in an asynchronous wireless communication evolving into LTE/LTE-advanced and IMT-2020 from GSM, WCDMA, and HSPA. Furthermore, the embodiments may be applicable to resource allocation in a synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal herein may refer to a low cost (or low complexity) user equipment category/type newly defined in 3GPP Release-13 and performing LTE-based MTC-related operations. The MTC terminal herein may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims to improve indoor coverage, to support for large-scale low-speed terminals, to lower latency sensitivity, to reduce terminal costs, to lower power consumption, and to optimize network architecture.

After 4th-generation (4G) communication technology, the development of 5th-generation (5G) communication technology has been in progress in the 3GPP, in order to meet requirements for next generation radio access technology under the ITU-R. Specifically, in the 3GPP, the development of a new NR communication technology has been in progress independently from 4G communication technology and LTE-A pro having improved LTE-Advanced technology according to requirements of the ITU-R to 3rd generation partnership project 5G communication technology. Both the LTE-A pro and the NR denote the 5G communication technology.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

Meanwhile, the term "NR" or "5G" may be interchangeable and is described as meaning encompassing new next generation network technologies meeting the 5G requirements described above. In addition, a radio access technology distinguished from the NR is described as a typical LTE technology.

A 5G network is split/classified into a 5G core network (hereinafter, referred to as 5GC, 5G CN, NGC etc.) and a 5G wireless access network (hereinafter, referred to as NG-RAN, 5G-RAN etc.). The NG-RAN may be configured with a set of one or more 5G NBs (gNBs), which are 5G base station nodes. An entity constituting the core network may be referred to as a core network entity.

Meanwhile, a base station employing the 5G radio access technology is descried as a 5G base station, a base station, or an NR base station, an NG-RAN, a gNB, or the like, but embodiments of the present disclosure are not limited to these terms. In addition, a base station employing the typical radio access technology is descried as a 4G base station, at least one other base station, or an LTE base station, an eNB, or the like, but embodiments of the present disclosure are not limited to these terms.

Various operation scenarios of the NR are introduced by adding various factors of a satellite, a vehicle, a new vertical, and the like, in typical 4G LTE scenarios. In terms of services, the NR supports an enhanced mobile broadband (eMBB) scenario, a massive machine communication (MMTC) scenario in which i) the density of UEs is high, ii) corresponding deployment is performed over a wide range, and iii) low data rate and asynchronous access are required, and an Ultra Reliability and Low Latency (URLLC) scenario in which high responsiveness and reliability are required and high-speed mobility is supported.

To satisfy such scenarios, the NR introduces a wireless communication system employing at least one of a new waveform and frame structure technique, a low latency technique, a millimeter-wave (mmWave) support technique and a forward compatible providing technique. In particular, such a NR wireless communication system has various technical changes in terms of flexibility in order to provide forward compatibility. Major technical features of the NR will be described below with reference to the drawings.

<General NR System>

FIG. 1 is a diagram schematically illustrating a structure of a NR system where embodiments of the present disclosure may be applied.

Referring to FIG. 1, the NR system is divided into a 5G core network (5GC) and an NG-radio access network (RAN). The NG-RAN includes a gNB, an ng-eNB, and the like, which provide user plane (SDAP/PDCP/RLC/MAC/PHY) and control plane (RRC) protocol terminations toward a UE. Interconnection between gNBs or between the gNB and the ng-eNB is performed through an Xn interface. Each of the gNB and the ng-eNB is connected to the 5GC through an NG interface. The 5GC may include i) an access and mobility management function (AMF) in charge of a control plane of a UE access and mobility control function, and the like, and ii) a user plane function (UPF) in charge of a control function for user data. The NR supports both a frequency range of 6 GHz or less (FR1, Frequency Range 1) and a frequency range of 6 GHz or more (FR2, Frequency Range 2).

The gNB denotes a base station providing NR user plane and control plane protocol terminations toward a UE, and the ng-eNB denotes a base station providing E-UTRA user plane and control plane protocol terminations toward a UE. The base station described herein should be interpreted as meaning including both the gNB and the ng-eNB, and the base station may be also used as meaning of either the gNB or the ng-eNB, when needed.

<NR Waveform, Numerology and Frame Structure>

In the NR, CP-OFDM waveform using cyclic prefix is used for DL transmission, and CP-OFDM or DFT-s-OFDM is used for UL transmission. The OFDM technique is easier to be combined with multiple input multiple output (MIMO), and the OFDM technique has the advantage of enabling a receiver with high frequency efficiency and a low complexity to be employed.

Meanwhile, in the NR, requirements for data rate, latency, coverage, etc. are different in each of the three scenarios described above. Therefore, it is necessary to efficiently satisfy the requirements for each scenario through a frequency band configured for an NR system. To do this, a technique has been proposed for efficiently multiplexing a plurality of numerology-based radio resources different from one another.

Specifically, NR transmission numerology is determined based on a subcarrier spacing and a cyclic prefix (CP), and the $\mu$ value is used as an exponential value of 2 based on 15 kHz and exponentially changed, as shown in Table 1 below.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
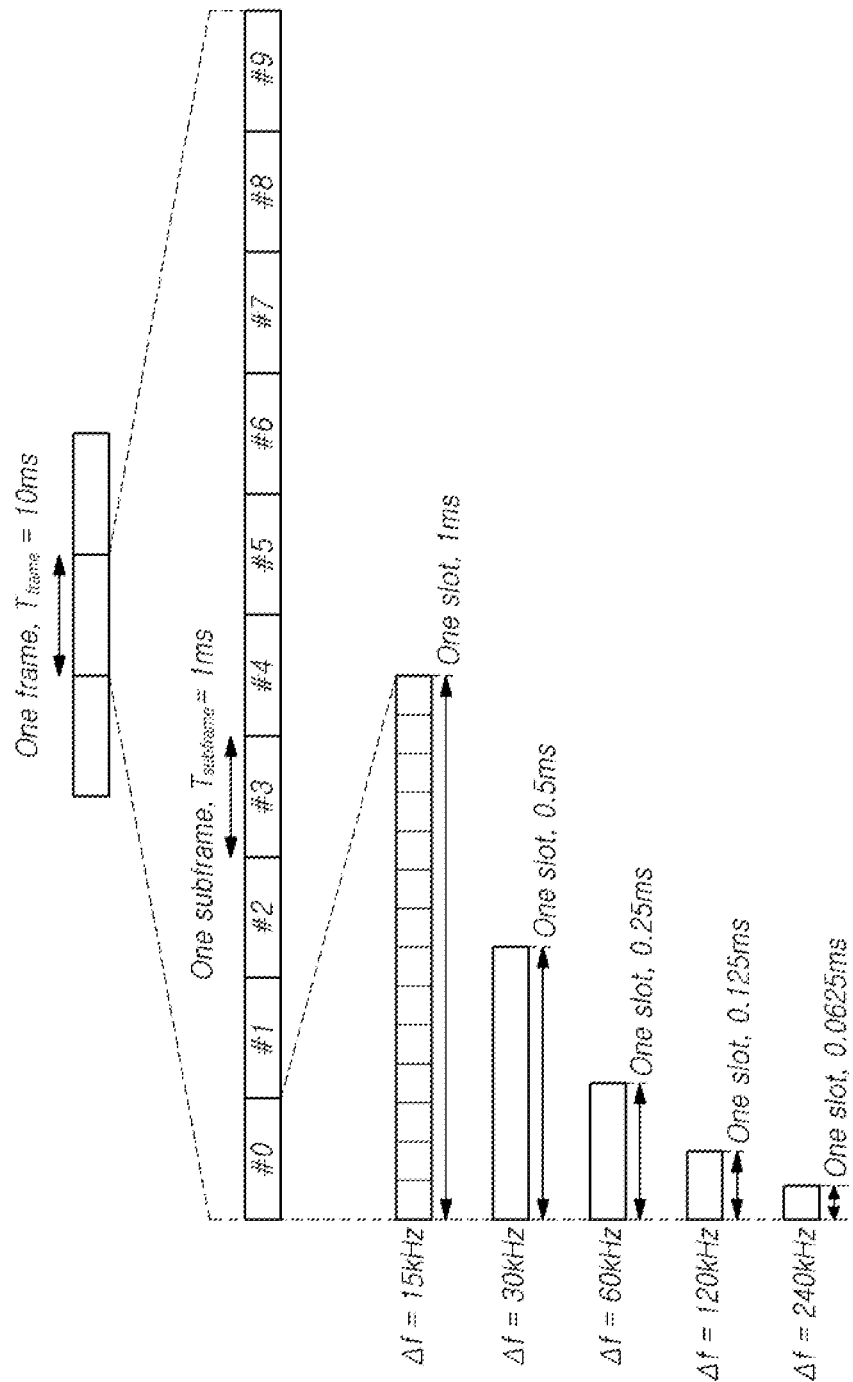
FIG. 2 is a diagram illustrating a frame structure of an NR system where embodiments of the present disclosure may be applied.

As shown in Table 1 above, the NR numerology is classified into five types according to the subcarrier spacing. This is different from the fixed 15 kHz subcarrier spacing of the LTE that is one of 4G communication techniques. Specifically, in the NR, subcarrier spacings used for data transmission are 15, 30, 60, and 120 kHz, and subcarrier spacings used for synchronous signal transmission are 15, 30, 12, and 240 kHz. Also, an extended CP is applied to only the 60 kHz subcarrier spacing. Meanwhile, as a frame structure of the NR, a frame is defined as a length of 10 ms made up of 10 subframes having the same length of 1 ms. One frame may be divided into 5 ms half frames, and each half frame includes 5 subframes. In the case of the 15 kHz subcarrier spacing, one subframe is made up of one slot, and each slot is formed of 14 OFDM symbols. FIG. 2 is a diagram illustrating a frame structure of an NR system where embodiments of the present disclosure may be applied.

Referring to FIG. 2, the slot is fixedly formed of 14 OFDM symbols in the case of normal CP, but the length of the slot in the time domain may be different depending on subcarrier spacings. For example, in the case of a numerology with the 15 kHz subcarrier spacing, the slot has 1 ms length identical to the subframe. In the case of a numerology with the 30 kHz subcarrier spacing, the slot is made up of 14 OFDM symbols and has 0.5 ms length. Therefore, two slots may be included in one subframe. That is, the subframe and the frame are defined with a fixed time length, and the slot is defined by the number of symbols. Therefore, different subcarrier spacings lead to different time lengths.

Meanwhile, NR defines a slot as a basic unit of scheduling and also introduces a minislot (or a subslot or a non-slot based schedule) to reduce transmission delay in the radio section. Since the length of one slot is shortened in inverse proportion when a wide subcarrier spacing is used, it is therefore possible to reduce the transmission delay in the radio section. The minislot (or subslot) is for efficient support for URLLC scenarios and can be scheduled on the basis of 2, 4, or 7 symbols.

Also, unlike the LTE, the NR defines UL and DL resource allocations on a symbol basis within one slot. In order to reduce HARQ latency, a slot structure capable of directly transmitting HARQ ACK/NACK in a transmission slot is defined, and this slot structure is referred to as a self-contained structure for description.

In the NR, the slot structure has been designed to enable a total of 256 slot formats to be supported, of which 62 slot formats are used in 3GPP Rel-15. In addition, a common frame structure forming an FDD or TDD frame is supported through combinations of various slots. For example, the NR supports a slot structure in which all symbols of a slot are configured in DL, a slot structure in which all symbols of a slot are configured in UL, and a slot structure in which DL symbols and UL symbols are combined. In addition, the NR supports that data transmission is scheduled to enable data to be distributed in one or more slots. Accordingly, a base station may inform a UE whether a corresponding slot is a DL slot, an UL slot, or a flexible slot, using a slot format indicator (SFI). The base station may indicate the slot format i) by indicating an index of a table configured through UE-specific RRC signaling, using the SFI, ii) dynamically through DL control information (DCI), or iii) statically or quasi-statically through RRC.

Herein, discussions are conducted on dual connectivity applicable to a base station employing the LTE radio access technology and a base station employing the NR radio access technology and performed between base stations employing different radio access technologies. Accordingly, a base station described below may be an LTE base station or an NR base station, and when necessary, a specific base station is indicated.

Embodiments of the present disclosure may be applicable to a 5G radio access network, an non-standalone (NSA)

network, a standalone (SA) network, a base station interworking interface, an X2 interface/protocol, an F1 interface/protocol, dual connectivity, E-UTRA-NR dual connectivity (EN-DC), base station and RAN load management, 5G user and control plane interfaces, NR and LTE protocols, network multi-vendor interoperability (MVI), or the like.

A method of managing a load and/or an overload for various resources used between base station nodes or nodes inside of base station for supporting heterogeneous radio access technologies has not been considered in the typical radio access technology. In particular, as the 5G network is newly introduced, it is essential to enable i) interworking of an NR base station with a typical LTE base station to be supported in the NSA structure, and ii) interworking between NR base stations to be supported in the SA structure. Further, interworking between a central unit (CU) and a distributed unit (DU) is supported as well as interworking between a CU-CP (control plane) and a CU-UP (user plane).

It is unable to share information on a load and overload status associated with one 5G base station node with another node; it is therefore difficult to perform appropriate load control. Accordingly, the base station system may fail to work correctly, and the stability thereof may be seriously affected. Thus, in order to enable optimal load management to be performed in the 5G base station, it is necessary to change the design of X2 and F1 control interfaces.

In particular, dual connectivity denotes that different base stations transmit data to or receive data from a UE using radio resources. The dual connectivity is employed in the 5G network as well.

Figure 3:
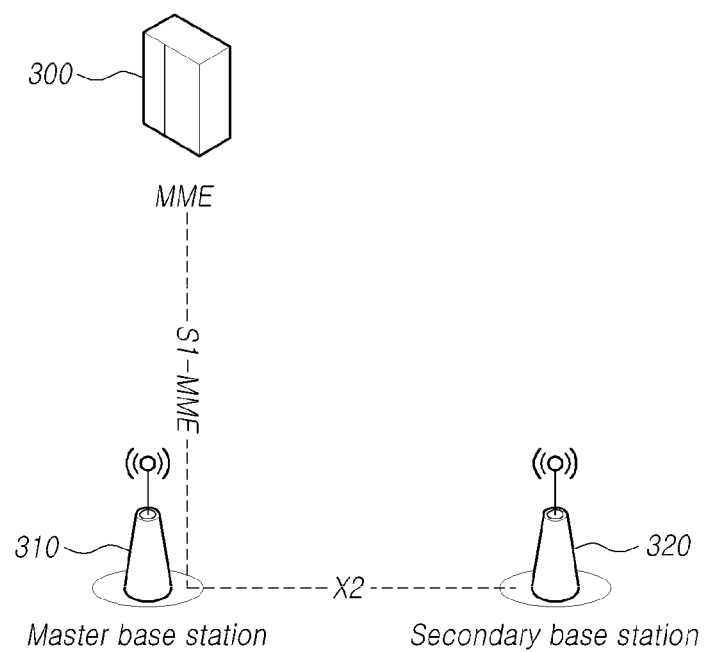
FIG. 3 is a diagram illustrating a dual connectivity structure where embodiments of the present disclosure may be applied.

FIG. 3 is a diagram illustrating a dual connectivity structure to which embodiments of the present disclosure can be applicable.

Referring to FIG. 3, a master base station 310 and a secondary base station 320 are interconnected with each other through the X2 interface and provide radio resources to a UE. When the dual connectivity is configured, the secondary base station 320 supplies only user plane data to the UE. Accordingly, a connection with a core network is established through an S1-MME interface between the master base station 310 and a core network entity (e.g., MME, 300).

That is, in the dual connectivity structure, the master base station 310 is connected to the core network entity 300, and the secondary base station 320 provides user plane data to a UE. As described above, in this case, there is a problem that the master base station 310 cannot recognize a load status of the secondary base station 320. In particular, as described above, when the NSA mode of the 5G network is implemented, the master base station 310 may employ a different radio access technology from the secondary base station 320 or the core network. Since there is a strong possibility that a 5G UE consumes a large amount of data, when transmitting data to or receiving data from the UE by establishing the dual connectivity, more importance can be placed on load management for the secondary base station 320.

Accordingly, hereinafter, discussions are conducted on a procedure for load management of base stations when the dual connectivity is configured, and embodiments related to the load management.

Figure 4:
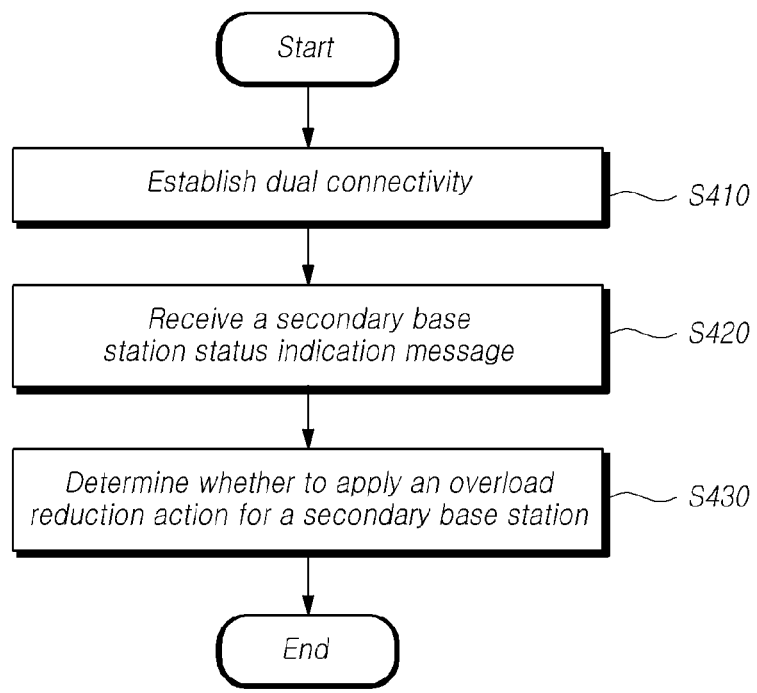
FIG. 4 is a flow diagram illustrating operation of a master base station according to an embodiment of the present disclosure.

FIG. 4 is a flow diagram illustrating operation of a master base station according to an embodiment of the present disclosure.

Referring to FIG. 4, a method of a master base station is provided for managing a load of a secondary base station. The master base station may establish dual connectivity with the secondary base station, at step S410. For example, the master base station may establish the dual connectivity with the secondary base station for a UE.

The master base station and the secondary base station herein may employ different radio access technologies. Further, both the master base station and the secondary base station may be base stations employing the 5G technology. Further, both control plane and user plane may be configured between the master base station and a core network, and only user plane may be configured between the secondary base station and the core network.

For example, the master base station may be an eNB employing the LTE radio access technology, and the secondary base station configured with the dual connectivity with the eNB for a UE may be a gNB employing the NR radio access technology. As another example, the master base station may be a gNB employing the NR radio access technology, and the secondary base station configured with the dual connectivity with the gNB for the UE may be an eNB employing the LTE radio access technology. As further another example, the master base station and the secondary base station may be base stations employing an identical radio access technology. For example, both the master base station and the secondary base station may be LTE base stations or NR base stations.

The core network may be an EPC associated with the LTE base station, or a 5GC associated with the NR base station.

A method of a master base station, which employs a different radio access technology from a secondary base station, for establishing dual connectivity with the secondary base station will be described again below.

The master base station may receive a secondary base station status indication message from the secondary base station through an X2 interface, at step S420. For example, the master base station may receive the secondary base station status indication message from the secondary base station through an X2 protocol.

The secondary base station status indication message may be periodically received. The transmission of the secondary base station status indication message may be triggered by the secondary base station when a preset condition is satisfied. The master base station may receive the secondary base station status indication message by the transmission of the secondary base station in response to a request of the master base station.

The secondary base station status indication message may include a message-type parameter and a secondary base station load information parameter. The message-type parameter may include a unique value specifying a procedure of a corresponding message, and an identical message-type parameter is used in an identical procedure. The secondary base station load information parameter may include either a value indicating an overload or a value indicating a non-overload.

For example, when the secondary base station is in an overload status, the secondary base station load information parameter may be set to the value indicating the overload (e.g., overloaded). When the secondary base station is in a normal status (not in the overload status), the secondary base station load information parameter may be set to the value indicating the non-overload (e.g., not-overloaded). When needed, the secondary base station load information parameter may be set to values indicating other statuses in addition to the above two values. For example, the secondary base station load information parameter may be set to a value indicating one of a normal status, an underload status and an overload status. There is no limitation to a value set as the secondary base station load information parameter, which may be set to one of values for differentiating N (N is a natural number of 2 or more) number of statuses.

The master base station may determine whether to apply an overload reduction action for the secondary base station based on a value of the secondary base station load information parameter included in the secondary base station status indication message, at step S430.

When the secondary base station status indication message is received, the master base station checks the value of the secondary base station load information parameter. When the secondary base station load information parameter has been set to a value indicating the overload of the secondary base station, the master base station may determine to trigger the overload reduction action for the secondary base station. When the secondary base station load information parameter has been set to a value indicating the non-overload of the secondary base station, the master base station dose not trigger the overload reduction action for the secondary base station.

The overload reduction action may be set variously by base station operators, and embodiments of the present disclosure are not limited to any specific action. For example, the overload reduction action may be an action reducing an amount of data transmitted to the secondary base station. As another example, the overload reduction action may be an action limiting the number of dual connectivity radio bearers allocated to the secondary base station. As further another example, the overload reduction action may be an action deactivating or releasing dual connectivity establishment of the secondary base station.

Meanwhile, when the overload reduction action is determined to be triggered, the master base station may keep applying the overload reduction action for the secondary base station until a secondary base station status indication message including the value indicating the non-overload is received. For example, when a first secondary base station status indication message is set to the value indicating the overload, the master base station triggers the overload reduction action. The master base station monitors an M secondary base station status indication message transmitted after the first secondary base station status indication message, and stops the overload reduction action when the secondary base station status indication message set to the value indicating the none-overload is received.

Through this operation, the master base station may acquire a degree of the load of the secondary base station rapidly and accurately over the X2 interface, and efficiently manage the load of the secondary base station based on such information even when different radio access technologies are used.

Figure 5:
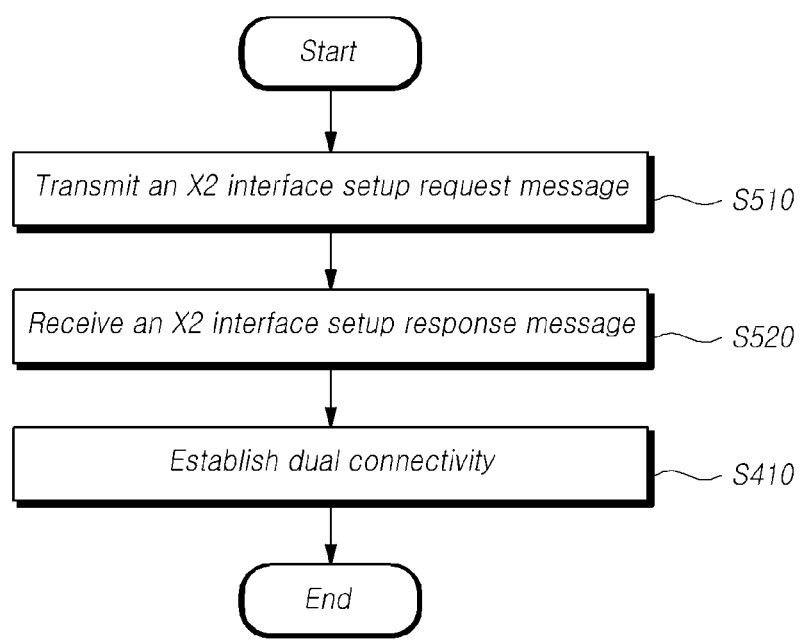
FIG. 5 is a flow diagram illustrating operation of a master base station according to another embodiment of the present disclosure.

FIG. 5 is a flow diagram illustrating operation of a master base station according to another embodiment of the present disclosure.

Referring to FIG. 5, a master base station may establish dual connectivity with a secondary base station. Here, the steps S510 and S520 may be included in the step S410 or performed sequentially.

Specifically, the master base station may transmit, to the secondary base station, an X2 interface setup request message including a list of all or a part of serving cells of the master base station, at step S510. The master base station transmits the X2 interface setup request message for establishing dual connectivity to at least one candidate secondary base station for deploying the dual connectivity for a UE. In this case, information on the list of all or a part of the serving cells provided by the master base station may be included in the X2 interface setup request message.

The master base station may receive, from the secondary base station, an X2 interface setup response message including a list of all or a part of serving cells of the secondary base station, at step S520. After the X2 interface setup request message is transmitted, the master base station receives, from the at least one candidate secondary base stations, the X2 interface setup response message including information on a list of all or a part of the serving cells of the at least one candidate secondary base station.

Thereafter, the master base station determines a secondary base station deploying the dual connectivity for the UE based on the received X2 interface setup response message, transmits configuration information needed to establish the dual connectivity to the secondary base station, and then establishes the dual connectivity, at step S410.

Through this, the master base station may select a specific secondary base station to be configured with the dual connectivity for the UE among candidate secondary base stations, and then establish the dual connectivity.

Hereinafter, a procedure of receiving secondary base station status indication information will be described according to various embodiments of the present disclosure. For convenience of description, in the following embodiments, it is assumed that a master base station is an eNB, and a secondary base station is a gNB; however, embodiments of the present disclosure are not limited thereto. For example, as described above, the master base station and the secondary base station may be a gNB and an eNB, respectively, or employ an identical radio access technology.

Figure 6:
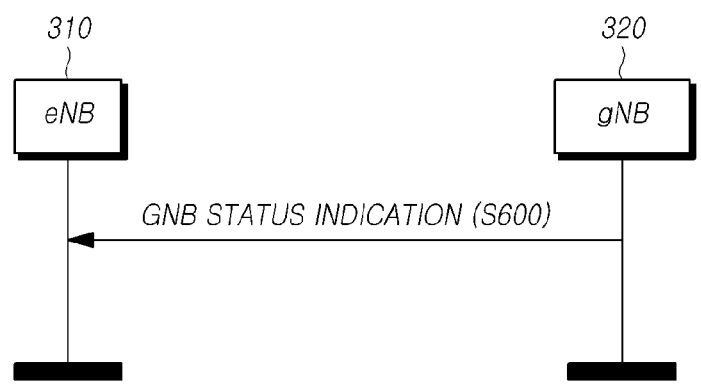
FIG. 6 is a signal diagram illustrating a procedure of transmitting a secondary base station status indication message according to an embodiment of the present disclosure.

FIG. 6 is a signal diagram illustrating a procedure of transmitting a secondary base station status indication message according to an embodiment of the present disclosure.

Referring to FIG. 6, the eNB 310 may receive a gNB status indication message from the gNB 320 through the X2 interface, at step S600. The gNB status indication message may include a message-type parameter and a gNB load information parameter indicating load information of the gNB.

As described above, the gNB load information parameter may include either a value indicating an overload or a value indicating a non-overload. Alternatively, the gNB load information parameter may include a value indicating one of a normal status, an overload status and an underload status.

As shown in FIG. 6, the gNB status indication message may be received irrespective of a separate request from the eNB 310. For example, the gNB status indication message may be transmitted or received according to a preset period. Alternatively, the gNB status indication message may be transmitted according to a result from checking by the gNB 320 whether a condition for triggering transmission is satisfied.

Figure 7:
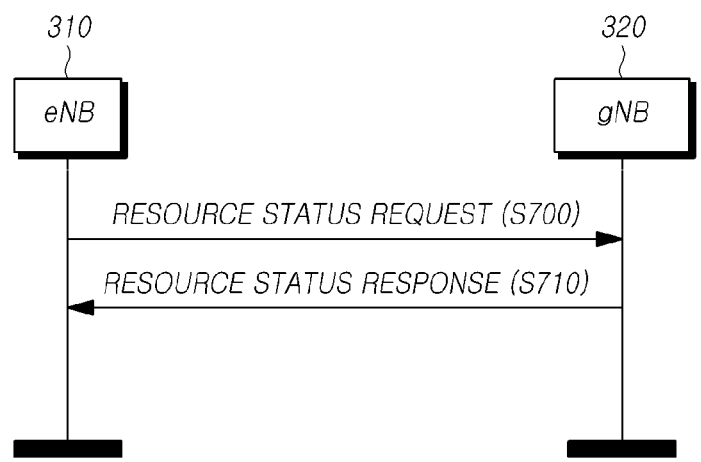
FIGS. 7 and 8 are signal diagrams illustrating a procedure of transmitting a secondary base station status indication message according to other embodiments of the present disclosure.
Figure 8:
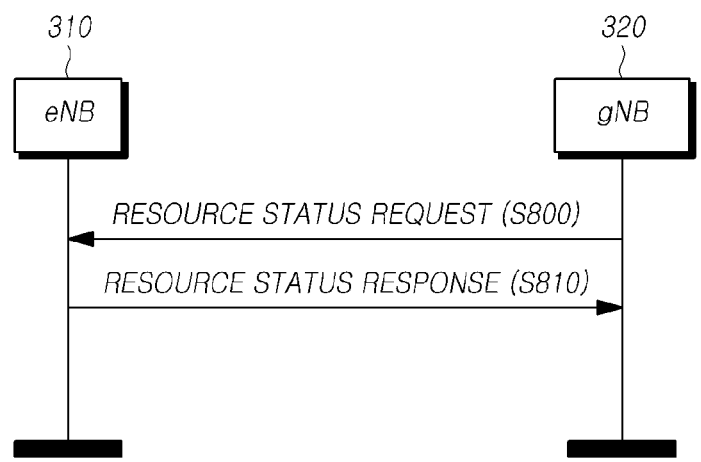

FIGS. 7 and 8 are signal diagrams illustrating a procedure of transmitting a secondary base station status indication message according to other embodiments of the present disclosure.

Referring to FIG. 7, the eNB 310 may transmit a resource status request message to the gNB 320 through the X2 interface, at step S700. That is, when needed, the eNB 310 may transmit a message for requesting load information of the gNB 320.

When the resource status request message is received, the gNB 320 may transmit a resource status response message to the eNB 310, at step S710. The resource status response message may be transmitted through the X2 interface and may include a message-type parameter and a gNB load information parameter indicating the load information of the gNB.

As described above, the gNB load information parameter may include either a value indicating an overload or a value indicating a non-overload. Alternatively, the gNB load information parameter may include a value indicating one of a normal status, an overload status and an underload status.

Referring to FIG. 8, the gNB 320 may transmit a resource status request message to the eNB 310 through the X2 interface, at step S800. That is, when needed, the gNB 320 may transmit a message for requesting load information of the eNB 310.

When the resource status request message is received, the eNB 310 may transmit a resource status response message to the gNB 320, at step S810. The resource status response message may be transmitted through the X2 interface and may include a message-type parameter and an eNB load information parameter indicating the load information of the eNB. The eNB load information parameter may include either a value indicating an overload or a value indicating a non-overload. Alternatively, the eNB load information parameter may include a value indicating one of a normal status, an overload status and an underload status.

In this embodiment, the gNB 320 may be a master base station. In another embodiment, the gNB 320 may be a secondary base station and need load status information of the master base station.

Figure 9:
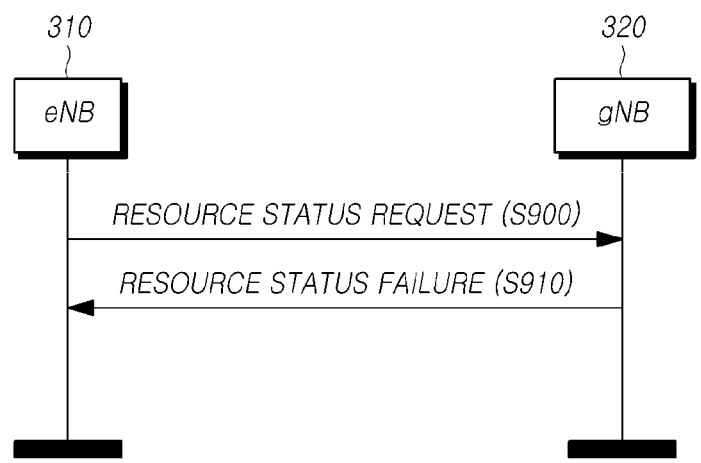
FIGS. 9 and 10 are signal diagrams illustrating a procedure when the transmission of a secondary base station status indication message fails according to other embodiments of the present disclosure.
Figure 10:
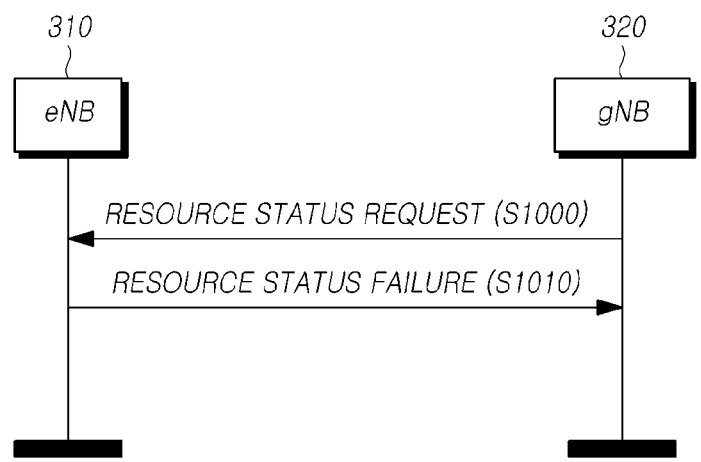

FIGS. 9 and 10 are signal diagrams illustrating a procedure when the transmission of a secondary base station status indication message fails according to other embodiments of the present disclosure.

Referring to FIG. 9, the eNB 310 may transmit a resource status request message to the gNB 320 through the X2 interface, at step S900. That is, when needed, the eNB 310 may transmit a message for requesting load information of the gNB 320.

When the resource status request message is received, the gNB 320 checks whether a response for the request message is available. When the gNB 320 cannot provide the resource status information in response to the request message, the gNB 320 transmits a resource status failure message to the eNB 310, at step S910. The resource status failure message may be transmitted through the X2 interface, and may include a message-type parameter and a cause parameter indicating that the load information of the gNB cannot be provided.

Referring to FIG. 10, the gNB 320 may transmit a resource status request message to the eNB 310 through the X2 interface, at step S1000. That is, when needed, the gNB 320 may transmit a message for requesting load information of the eNB 310.

When the resource status request message is received, the eNB 310 checks whether providing the resource status information is available. When the eNB 310 cannot provide the resource status information in response to the request message, the eNB 310 transmits a resource status failure message to the gNB 320, at step S1010. The resource status failure message may be transmitted through the X2 interface, and the resource status failure message may include a message-type parameter and a cause parameter indicating that the load information of the eNB cannot be provided.

Figure 11:
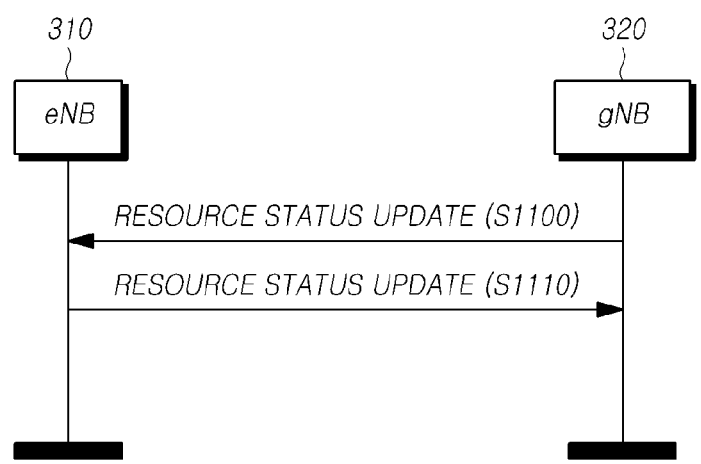
FIG. 11 is a signal diagram illustrating a procedure of updating a resource status between different base stations according to embodiments of the present disclosure.

FIG. 11 is a signal diagram illustrating a procedure of updating a resource status between different base stations according to embodiments of the present disclosure.

Referring to FIG. 11, the eNB 310 may receive a resource status update message from the gNB 320 through the X2 interface, at step S1100. The resource status update message may include a message-type parameter and a gNB load information parameter indicating load information of the gNB.

Alternatively, the gNB 320 may receive a resource status update message from the eNB 310 through the X2 interface, at step S1110. The resource status update message may include a message-type parameter and an eNB load information parameter indicating load information of the eNB.

As described above, the eNB load information parameter and the gNB load information parameter may include either a value indicating an overload or a value indicating a non-overload. Alternatively, the eNB load information parameter and the gNB load information parameter may include a value indicating one of a normal status, an overload status and an underload status.

FIG. 11 depicts a scenario in which the process of FIG. 6 is performed in respective base stations 310 and 320. That is, the steps S1100 and S1110 may be performed independently irrespective of order. As another example, when a message according to the step S1100 is received, the eNB 310 may perform the step S1110. As further another example, when a message according to the step S1110 is received, the gNB 320 may transmit a message equally to the step S110. That is, when each base station 310 or 320 receives load information of one or more counterpart base stations 320 or 310, the base station 310 or 320 may transmit its load information.

The names of respective messages and parameters described referring to FIGS. 6 to 11 are merely for convenience of description and ease of understanding; therefore, embodiments of the present disclosure are not limited thereto. Hereinafter, various embodiments of operations and parameters described above will be described in terms of each message.

1) A Resource Status Request Message

As described above, an eNB may transmit a resource status request message to a gNB (or vice versa). Parameters representing an eNB measurement ID and a gNB measurement ID which are load measurement identifiers for the eNB and the gNB may be included in the resource status request message.

Each of a gNB-CU measurement ID, a gNB-CU-CP measurement ID, a gNB-CU-UP measurement ID, a gNB-DU measurement ID, and a gNB-RU measurement ID may be used, which are load measurement identifiers for a gNB CU, a CU-CP, a CU-UP, a DU and a RU, respectively. Similarly, each of an eNB-DU measurement ID and an eNB-RU measurement ID may be used, which are load measurement identifiers for an eNB DU and a RU, respectively.

The measurement IDs of the eNB and the gNB may be split/classified into an ID corresponding to a load associated with an LTE UE and an ID corresponding to a load associated with an NSA UE. For example, the measurement IDs of the eNB and the gNB may be classified into 4 types, that is, an eNB measurement ID for the LTE and an eNB measurement ID for the NSA, and a gNB measurement ID for the LTE and a gNB measurement ID for the NSA.

Alternatively, only the measurement IDs of the eNB may be split/classified into an ID corresponding to a load associated with an LTE UE and an ID corresponding to a load associated with an NSA UE. For example, the measurement IDs of the eNB may be classified into the eNB measurement ID for the LTE and the eNB measurement ID for the NSA.

The resource status request message may include information on LTE cells or NR cells. The resource status request message may also include information on at least one of a frequency and a bandwidth part of at least one cell, LTE and NR component carriers configured to be used, throughput available on a cell basis (or data rate), an available throughput (or data rate) ratio. The resource status request message may also include information indicating whether a corresponding bandwidth is a licensed/unlicensed/shared.

Load information on each base station may be measured for entire connected bearers or for each bearer type. For example, each base station may calculate a load based on an MCG bearer, an SCG split bearer, or an SCG bearer. Alternatively, the load information may be measured for entire frequencies or each frequency used in the NR gNB. For example, the load may be calculated based on 3.5 GHz frequency and/or 28 GHz frequency. When one or more frequencies are used for both the LTE and the NR in an identical frequency band, the load may be measured for a total of the frequencies.

2) A Resource Status Response Message

When the gNB is available to provide the load status and information requested from the eNB (or vice versa), the gNB (or eNB) measures/calculates corresponding information and reports information/data obtained by the measuring/calculating through a resource status response message.

For example, each base station is able to provide whether all or part of requested load information is available to provide through the resource status response message. Each base station is able to transmit an information list available to provide and a list not available to provide, which are included in the resource status response message.

Further, the resource status response message may include the calculated load information or information indicating an overload or a non-overload.

3) A Resource Status Failure Message

When the gNB is not able to provide the load status and information requested from the eNB (or vice versa), each base station informs the eNB (or gNB) of it through the resource status failure message. The resource status failure message may include information indicating a cause of failure to provide the load information.

4) A Resource Status Update Message

The gNB updates the eNB (or vice versa) on the load status and information through the resource status update message. The update may be performed according to a specific event or periodically. In the case of the periodical update, a period of update is set.

The load information used in base stations (an eNB and a gNB) of the NSA may include all or one or more of the following factors:

5) NR gNB Related Load Information

Load information transmitted by the gNB may include at least one of the following respective information.

Load information on a cell basis (a DL, a UL, a DU+UL, a SUL)
  Load information on a frequency basis
  Load information on a UE basis (an NSA UE, a SA UE)
  The number of NR CA connections and NR CA load information
  At least one of the entire load information of the gNB, CP processing load information, UP processing load information and VM load information
  At least one of the entire load of a gNB CU, a CP processing load, a UP processing load and a VM load
    It should be noted that when a CU is split into CU-CP and CU-UP, a CU-CP load, a CU-UP load, a CU-CP VM load, and a CU-CP VM load may be added or replaced.
  At least one of the entire load of a gNB DU, a CP processing load, a UP processing load and a VM load
    It should be noted that load information on a case where a RU is included in a DU and a case where the RU is not included in the DU is available.
  At least one of the entire load of a gNB RU, a CP processing load, a UP processing load and a VM load
  At least one of transmission network load between the gNB and the eNB and transmission latency information
  At least one of transmission network load between the gNB and the gNB and transmission latency information
  At least one of transmission network load between gNB CU-DU and transmission latency information
  At least one of transmission network load between gNB DU-RU and transmission latency information
  At least one of a start time, an end time, and a duration of each load status 6) LTE eNB Related Load Information Load information transmitted by the eNB may include at least one of the following respective information.

Load information on a cell basis (a DL, a UL, a DU+UL, a SUL)
  Load information on a frequency basis
  Load information on a UE basis (an NSA UE, a SA UE)
  The number of LTE CA connections and LTE CA load information
  At least one of the entire load of the eNB, a CP processing load, a UP processing load and a VM load
  At least one of the entire load of an eNB DU, a CP processing load, a UP processing load and a VM load
    It should be noted that load information on a case where a RU is included in a DU and a case where the RU is not included in the DU is available.
  At least one of the entire load of an eNB RU, a CP processing load, a UP processing load and a VM load
  At least one of transmission network load between the eNB and the eNB and transmission latency information
  At least one of transmission network load between eNB DU-RU and transmission latency information
  At least one of a start time, an end time, and a duration of each load status Meanwhile, the load status described above may be classified qualitatively or quantitatively as follows, or be formed of a combination of some or all of them.

1) Low, medium, high, and critical
2) Normal, and overloaded
3) Not overloaded, and overloaded
4) Underloaded, normal, and overloaded
5) A relative level value of load (e.g., no load 0 to maximum load 100)
6) A relative percentage of load (e.g., minimum 0% to maximum 100%)
7) A value of a corresponding state (e.g., the number of CA connections, the number of VMs, etc.)

Through operations described above, the master base station may acquire the load information of the secondary base station, and perform efficient load management. Hereinafter, discussions are conducted on embodiments of applying the above operations for load management between logical nodes of the 5G base station (gNB).

Figure 12:
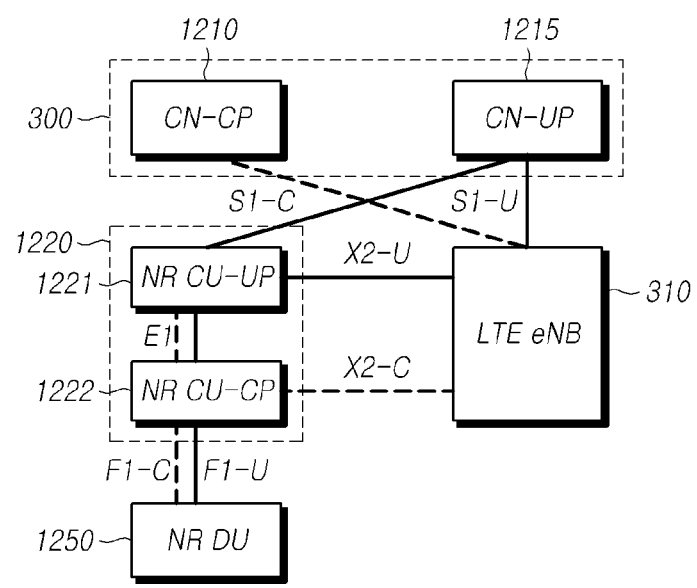
FIG. 12 is a diagram illustrating a dual connectivity structure with central units and distributed units according to an embodiment of the present disclosure.

FIG. 12 is a diagram illustrating a dual connectivity structure configured with a central unit and a distributed unit according to an embodiment of the present disclosure.

Referring to FIG. 12, a 5G network is divided into, and formed of, a core network (CN) 300 and a radio access network (RAN) of the NR and/or the LTE. It is assumed that a UE is a dual-mode UE capable of being connected to both an NR base station (1220+1250) and an LTE base station 310.

The core network 300 is classified into a control plane (CP) entity 1210 and a user plane (UP) entity 1215, which include a CN-CP apparatus 1210 (e.g., MME/AMF/SMF) and a CN-UP apparatus 1215 (e.g., SGW/PGW/UPF), respectively. Interfacing between the CN-CP apparatus 1210 and the CN-UP apparatus 1215 is performed through a standardized interface.

Further, interfacing between the CN 300 and an NR/LTE base station is performed by an upgraded S1 interface capable of supporting the NSA, or an NG (or N2) interface available to support the SA.

According to a radio network deployment scenario of an operator and a characteristic of a used frequency, the NR base station (1220+1250) or the LTE 310 is a master base station. As described above, for convenience of description, it is assumed that the eNB 310 is the master base station. The master base station 310 is connected to the CN-CP apparatus 1210 through an S1-C/NG-C interface and connected to CN-UP apparatus 1215 through an S1-U/NG-U interface.

Meanwhile, an interface directly connected for interworking between the NR base station (1220+1225) and the LTE base station 310 is defined as "X2" (or referred to as "X2 EN-DC"), and thus discussions are conducted using the X2 interface. The X2 interface may be considered as an inter-RAT-interworking interface between NR and LTE base stations, and the X2 interface is required to support mobility across one or more radio sections and multi-connectivity between the NR and LTE base stations.

A CU node 1220 of the NR base station may be further divided into a CU-CP node 1222 and a CU-UP node 1221, which are interconnected through an E1 control interface. Further, the NR base station may be divided into a CU node 1220 and a DU node 1250, which are interconnected through F1-C and an F1-U interfaces. Here, an NR gNB DU 1250 may be a node including all of RLC, MAC, and PHY, or a node including only a part of the RLC, the MAC, and the PHY by being further separated from a RU node. For example, the DU 1250 may include the RLC and the MAC, and the RU may include the PHY. Further, in the LTE eNB 310, a digital unit (DU) and a radio unit (RU) may be integrated or separated from each other.

Meanwhile, the 5G NSA network includes the LTE base station 310 and the NR base station (1220+1225) capable of supporting various frequencies. That is, when a cell or a base station node with a small load is selectable, it is possible to improve throughput of a UE and to operate stably a network.

Further, when configured base station functionality is operably mounted on a virtualization system, since processing performance can be affected according to a virtual machine (VM) load of a corresponding node, a CP processing load, a UP processing load, a transmission network load between nodes, or the like, it is possible to improve the performance through appropriate load distribution.

Accordingly, load management between the gNB CU 1220 and the DU 1250 may be additionally needed. In this case, it is possible to change and apply a status indication operation over the X2 interface described above. Names of a status indication message and respective parameters described below are merely examples for ease of understanding; therefore, embodiments of the present disclosure are not limited thereto. The names can be changed when necessary.

Figure 13:
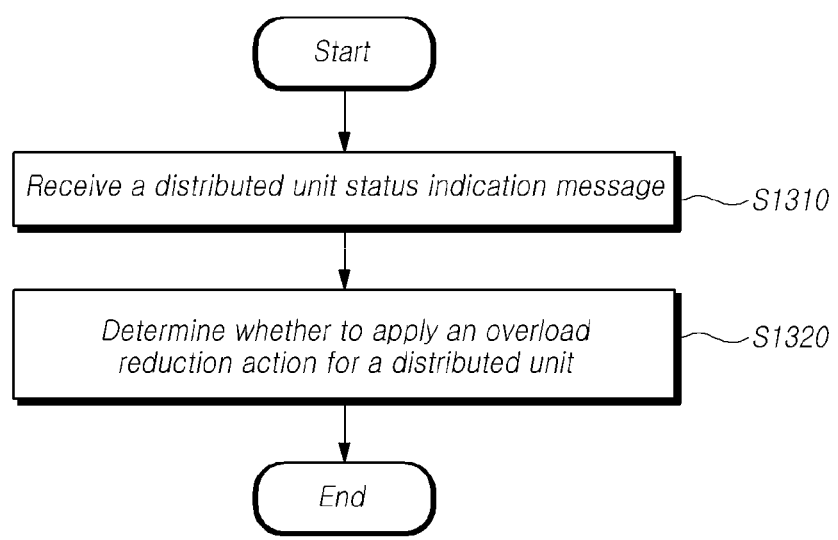
FIG. 13 is a flow diagram illustrating operation of a central unit according to an embodiment of the present disclosure.

FIG. 13 is a flow diagram illustrating operation of a central unit according to an embodiment of the present disclosure.

Referring to FIG. 13, a method of the central unit (CU) is provided for managing a load of a distributed unit (DU). In accordance with the method, the central unit may receive a distributed unit status indication message from the distributed unit through an F1 interface, at step S1310.

As described above, a base station may include (e.g., formed of) one central unit and one or more distributed units. Further, the central unit is a logical node hosting radio resource control (RRC) and packet data convergence protocol (PDCP) of the base station. The distributed unit is a logical node hosting radio link control (RLC), medium access control (MAC) and physical (PHY) of the base station.

The distributed unit status indication message may be periodically received. The transmission of the distributed unit status indication message may be triggered by the distributed unit when a preset condition is satisfied. As another example, the central unit may receive the distributed unit status indication message transmitted by the distributed unit in response to a request from the central unit.

The distributed unit status indication message may include a message-type parameter, a transaction identification parameter and a distributed unit load information parameter. The message-type parameter indicates a type of a corresponding message. The transaction ID information element (IE) uniquely identifies a procedure among all ongoing parallel procedures of the same type initiated by the same protocol peer. Messages belonging to the same procedure shall use the same transaction ID. The transaction ID is determined by the initiating peer of a procedure.

The distributed unit load information parameter may include either a value indicating an overload or a value indicating a non-overload.

For example, when the distributed unit is in an overload status, the distributed unit load information parameter may be set to the value indicating the overload (e.g., overloaded). When the distributed unit is in a normal status (not in the overload status), the distributed unit load information parameter may be set to the value indicating the non-overload (e.g., not-overloaded). When needed, the distributed unit load information parameter may be set to values indicating other statuses in addition to the above two values. For example, the distributed unit load information parameter may be set to a value indicating one of a normal status, an underload status and an overload status. There is no limitation to a value set as the distributed unit load information parameter, which may be set to one of values for differentiating N (N is a natural number of 2 or more) number of statuses.

The central unit may determine whether to apply an overload reduction action for the distributed unit based on a value of the distributed unit load information parameter included in the distributed unit status indication message, at step S1320.

When the distributed unit status indication message is received, the central unit checks the value of the distributed unit load information parameter. When the distributed unit load information parameter has been set to the value indicating the overload of the distributed unit, the central unit may determine to trigger the overload reduction action for the distributed unit. When the distributed unit load information parameter has been set to the value indicating the non-overload of the distributed unit, the central unit dose not trigger the overload reduction action for the distributed unit.

The overload reduction action may be set variously by base station operators, and embodiments of the present disclosure are not limited to any specific action. For example, the overload reduction action may be an action reducing an amount of data transmitted to the distributed unit. As another example, the overload reduction action may be an action limiting the number of radio bearers allocated to the distributed unit. As further another example, the overload reduction action may be an action deactivating or releasing the configuration of the distributed unit.

Meanwhile, when the overload reduction action is determined to be triggered, the central unit may keep applying the overload reduction action for the distributed unit until a distributed unit status indication message including the value indicating the non-overload is received. For example, when a first distributed unit status indication message is set to the value indicating the overload, the central unit triggers the overload reduction action, the central unit monitors an M distributed unit status indication message transmitted after the first distributed unit status indication message and keeps applying the overload reduction action until a distributed unit status indication message set to the value indicating the none-overload is received.

Through this operation, the central unit may acquire a degree of the load of the distributed unit rapidly and accurately over the F1 interface, and efficiently manage the load of the distributed unit.

Figure 14:
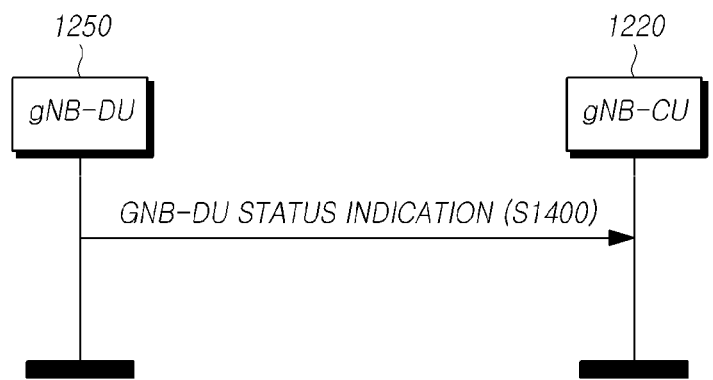
FIG. 14 is a signal diagram illustrating a procedure of transmitting a distributed unit status indication message according to an embodiment of the present disclosure.

FIG. 14 is a signal diagram illustrating a procedure of transmitting the distributed unit status indication message according to an embodiment of the present disclosure.

Referring to FIG. 14, the gNB-DU 1250 may transmit a gNB-DU status indication message to the gNB-CU 1220 through the F1 interface, at step S1400. The gNB-DU status indication message may include a message-type parameter, a transaction ID parameter and a distributed unit load information parameter indicating load information of the gNB-DU.

As described above, the distributed unit load information parameter may include either a value indicating an overload or a value indicating a non-overload. Alternatively, the distributed unit load information parameter may include a value indicating one of a normal status, an overload status and an underload status.

As shown in FIG. 14, the gNB-DU status indication message may be received irrespective of a separate request message from the gNB-CU 1220. For example, the gNB-DU status indication message may be transmitted or received according to a preset period. Alternatively, the gNB-DU status indication message may be transmitted according to a result from checking by the gNB-DU 1250 whether a condition for triggering transmission is satisfied.

Figure 15:
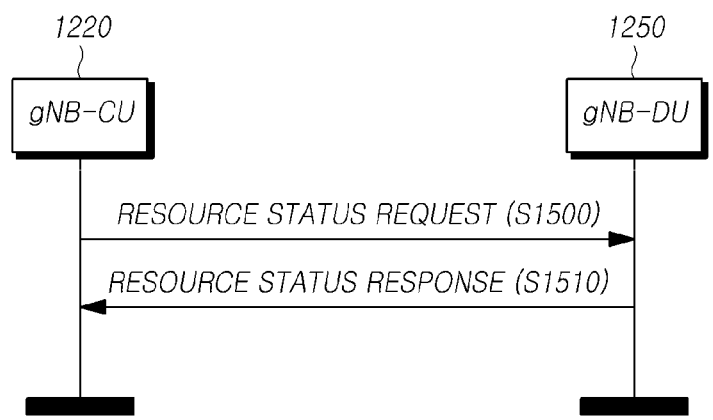
FIGS. 15 and 16 are signal diagrams illustrating a procedure of transmitting a distributed unit status indication message according to other embodiments of the present disclosure.
Figure 16:
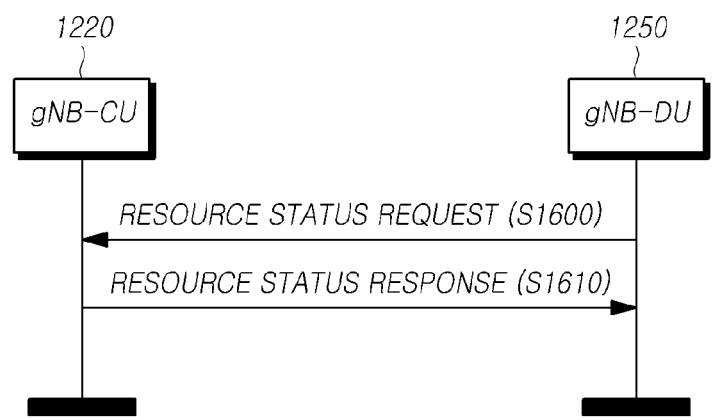

FIGS. 15 and 16 are signal diagrams illustrating a procedure of transmitting a distributed unit status indication message according to other embodiments of the present disclosure. Here, in some embodiments, the distributed unit status indication message is referred to as a resource status response message.

Referring to FIG. 15, the gNB-CU 1220 may transmit a resource status request message to the gNB-DU 1250 through the F1 interface, at step S1500. That is, when needed, the gNB-CU 1220 may transmit a message for requesting load information of the gNB-DU 1250.

When the resource status request message is received, the gNB-DU 1250 may transmit a resource status response message to the gNB-CU 1220, at step S1510. The resource status response message may be transmitted through the F1 interface, and the resource status response message may include a message-type parameter, a transaction identification parameter and a distributed unit load information parameter indicating the load information of the gNB-DU.

As described above, the distributed unit load information parameter may include either a value indicating an overload or a value indicating a non-overload. Alternatively, the distributed unit load information parameter may include a value indicating one of a normal status, an overload status and an underload status.

Referring to FIG. 16, the gNB-DU 1250 may transmit a resource status request message to the gNB-CU 1220 through the F1 interface, at step S1600. That is, when needed, the gNB-DU 1250 may transmit a message for requesting load information of the gNB-CU 1220.

When the resource status request message is received, the gNB-CU 1220 may transmit a resource status response message to the gNB-DU 1250, at step S1610. The resource status response message may be transmitted through the F1 interface, and the resource status response may include a message-type parameter, a transaction identification parameter and a central unit load information parameter indicating the load information of the eNB-CU. The central unit load information parameter may include either a value indicating an overload or a value indicating a non-overload. Alternatively, the eNB central unit load information parameter may include a value indicating one of a normal status, an overload status and an underload status.

Figure 17:
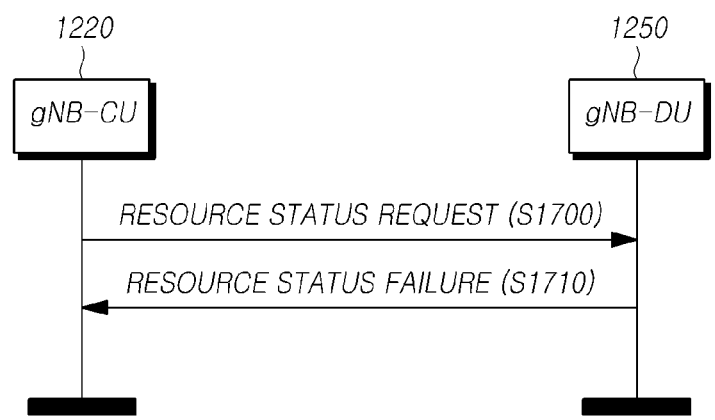
FIGS. 17 and 18 are signal diagrams illustrating a procedure when the transmission of a distributed unit status indication message fails according to other embodiments of the present disclosure.
Figure 18:
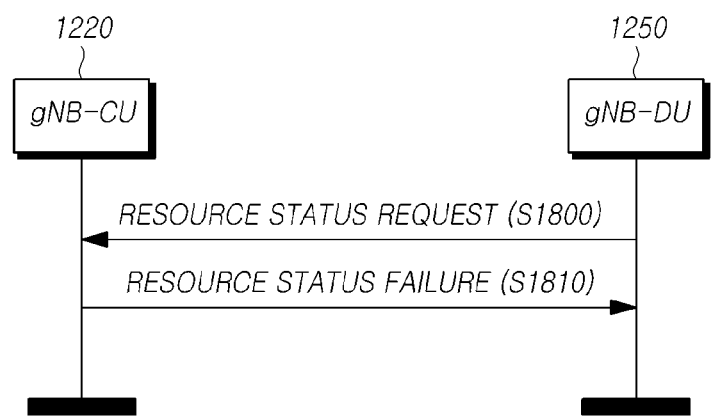

FIGS. 17 and 18 are signal diagrams illustrating a procedure when the transmission of a distributed unit status indication message fails according to other embodiments of the present disclosure.

Referring to FIG. 17, the gNB-CU 1220 may transmit a resource status request message to the gNB-DU 1250 through the F1 interface, at step S1700. That is, when needed, the gNB-CU 1220 may transmit a message for requesting load information of the gNB-DU 1250.

When the resource status request message is received, the gNB-DU 1250 checks whether a response for the request message is available. When the gNB-DU 1250 is unable to provide the resource status information in response to the request message, the gNB-DU 1250 transmits a resource status failure message to the gNB-CU 1220, at step S1710. The resource status failure message may be transmitted through the F1 interface, and the resource status failure message may include a message-type parameter, a transaction identification parameter and a cause parameter indicating that the load information of the gNB-DU 1250 cannot be provided.

Referring to FIG. 18, the gNB-DU 1250 may transmit a resource status request message to the gNB-CU 1220 through the F1 interface, at step S1800. That is, when needed, the gNB-DU 1250 may transmit a message for requesting load information of the gNB-CU 1220.

When the resource status request message is received, the gNB-CU 1220 checks whether providing the resource status information is available. When the gNB-CU 1220 is unable to provide the resource status information in response to the request message, the gNB-CU 1220 transmits a resource status failure message to the gNB-DU 1250, at step S1810. The resource status failure message may be transmitted through the F1 interface, and the resource status failure message may include a message-type parameter, a transaction identification parameter and a cause parameter indicating that the load information of the gNB-CU 1220 cannot be provided.

Figure 19:
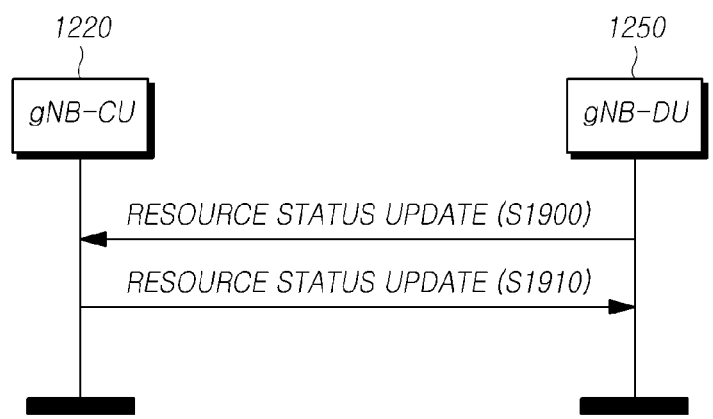
FIG. 19 is a signal diagram illustrating a procedure of updating a resource status between a central unit and a distributed unit according to embodiments of the present disclosure.

FIG. 19 is a signal diagram illustrating a procedure of updating a resource status between a central unit and a distributed unit according to embodiments of the present disclosure.

Referring to FIG. 19, the gNB-CU 1220 may receive a resource status update message from the gNB-DU 1250 through the F1 interface, at step S1900. The resource status update message may include a message-type parameter, a transaction identification parameter and a distributed unit load information parameter indicating load information of the gNB-DU 1250.

Alternatively, the gNB-DU 1250 may receive a resource status update message from the gNB-CU 1220 through the F1 interface, at step S1910. The resource status update message may include a message-type parameter, a transaction identification parameter and a central unit load information parameter indicating load information of the gNB-CU 1220.

As described above, the central unit load information parameter and the distributed unit load information parameter may include either a value indicating an overload or a value indicating a non-overload. Alternatively, the central unit load information parameter and the distributed unit load information parameter may include a value indicating one of a normal status, an overload status and an underload status.

FIG. 19 depicts a scenario in which the process of FIG. 14 is performed by respective nodes 1220 and 1250. That is, the steps S1900 and S1910 may be performed independently irrespective of order. As another example, when a message according to the step S1900 is received, the gNB-CU 1220 may perform the step S1910. As further another example, when a message according to the step S1910 is received, the gNB-DU 1250 may transmit a message equally to the step S1900. That is, when each node 1220 or 1250 receives load information of one or more counterpart nodes 1250 and/or 1220, the node 1220 or 1250 may transmit its load information.

The names of respective messages and parameters described referring to FIGS. 14 to 19 are merely for convenience of description and ease of understanding; therefore, embodiments of the present disclosure are not limited thereto. Hereinafter, various embodiments of operations described above will be described in terms of each message and parameter.

1) A Resource Status Request Message

A CU requests a DU to report load status and information of the DU by transmitting a resource status request message to the DU (or vice versa).

Each of a gNB-CU measurement ID, a gNB-CU-CP measurement ID, a gNB-CU-UP measurement ID, a gNB-DU measurement ID, and a gNB-RU measurement ID may be used, which are load measurement identifiers for a gNB CU, a CU-CP, a CU-UP, a DU and a RU, respectively. Such measurement IDs of the gNB may be split/classified into an ID corresponding to a load associated with a SA UE and an ID corresponding to a load associated with an NSA UE. For example, the measurement IDs of the gNB may be classified into a gNB measurement ID for the SA and a gNB measurement ID for the NSA.

The resource status request message may include i) information on NR cells, ii) information on at least one of a frequency and a bandwidth part of at least one cell, an NR component carrier configured to be used, throughput available on a cell basis (or data rate), an available throughput (or data rate) ratio, and iii) information indicating whether a corresponding bandwidth is a licensed/unlicensed/shared.

Load information may be measured for entire connected bearers or for each bearer type. For example, load calculation may be performed based on an MCG bearer, an SCG split bearer, or an SCG bearer. Alternatively, the load information may be measured for entire frequencies or each frequency used in the NR gNB. For example, the load calculation may be performed based on 3.5 GHz frequency and/or 28 GHz frequency. When one or more frequencies are used for both the LTE and the NR in an identical frequency band, the load may be measured for a total of the frequencies.

2) A Resource Status Response Message (a Distribution Status Indication Message)

When the DU is able to provide the load status and information requested from the CU (or vice versa), the DU (or CU) measures/calculates corresponding information and reports information/data obtained by the measuring/calculating through a resource status response message.

The resource status response message may include information indicating whether all or part of requested load information is available to provide, and the resource status response message may include information on a list of load information available to provide and a list of load information not available to provide.

3) A Resource Status Failure Message

When the DU is not available to provide the load status and information requested from the CU (or vice versa), the DU (or CU) informs the CU (or DU) of it through the resource status failure message. The resource status failure message may include information indicating a cause of failure to provide the load status and load information.

4) A Resource Status Update Message

The DU updates the CU (or vice versa) on the load status and information through the resource status update message. The update may be performed according to a specific event or periodically. In the case of the periodical update, a period of update is set.

Messages described above have been defined by the F1 interface based load management method between the gNB CU and the DU, and such messages may be equally applied to in a SA network as well.

5) NR gNB Related Load Information

Load information transmitted by the gNB-DU or the gNB-CU may include at least one of the following respective information.

- Load information on a cell basis (a DL, a UL, a DU+UL, a SUL)
- Load information on a frequency basis
- Load information on a UE basis (an NSA UE, a SA UE)
- The number of NR CA connections and NR CA load information
- At least one of the entire load information of the gNB, CP processing load information, UP processing load information and VM load information
- At least one of the entire load of a gNB CU, a CP processing load, a UP processing load and a VM load It should be noted that when a CU is split into CU-CP and CU-UP, a CU-CP load, a CU-UP load, a CU-CP VM load, and a CU-CP VM load may be added or replaced.
- At least one of the entire load of an gNB DU, a CP processing load, a UP processing load and a VM load It should be noted that load information on a case where a RU is included in a DU and a case where the RU is not included in the DU is available.
- At least one of the entire load of a gNB RU, a CP processing load, a UP processing load and a VM load At least one of transmission network load between the gNB and the eNB and transmission latency information At least one of transmission network load between the gNB and the gNB and transmission latency information At least one of transmission network load between gNB CU-DU and transmission latency information At least one of transmission network load between gNB DU-RU and transmission latency information At least one of a start time, an end time, and a duration of each load status Meanwhile, the load status described above may be classified qualitatively or quantitatively as follows, or be formed of a combination of some or all of them.

1) Low, medium, high, and critical
2) Normal, and overloaded
3) Not overloaded, and overloaded
4) Underloaded, normal, and overloaded
5) A relative level value of load (e.g., no load 0 to maximum load 100)
6) A relative percentage of load (e.g., minimum 0% to maximum 100%)
7) A value of a corresponding state (e.g., the number of CA connections, the number of VMs, etc.)

As described above, in accordance with embodiments of the present disclosure, it is possible to perform efficient load management between base stations or base station nodes in the 5G radio access network supporting heterogeneous radio technologies. Further, through such load management, it is possible to provide stable connectivity and transmission rate, and reduce cost of establishing and operating a radio network considerably.

Hereinafter, the master base station and the central unit described above will be described with reference to drawings.

Figure 20:
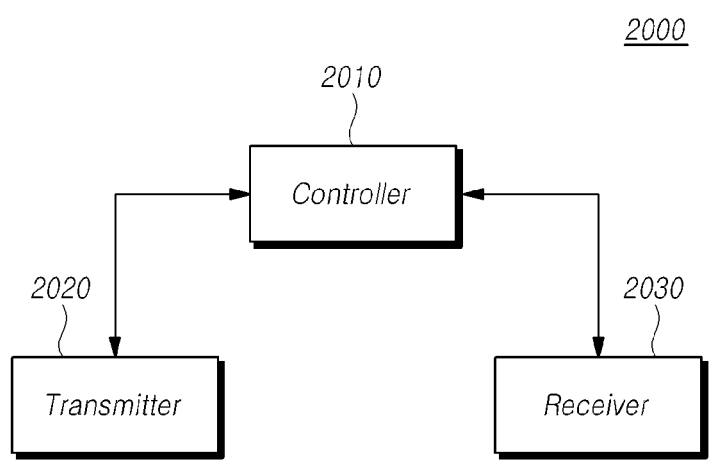
FIG. 20 is a block diagram illustrating a master base station according to an embodiment of the present disclosure.

FIG. 20 is a block diagram illustrating a master base station according to an embodiment of the present disclosure.

Referring to FIG. 20, the master base station 2000 includes i) a controller 2010 establishing dual connectivity with a secondary base station and ii) a receiver 2030 receiving a secondary base station status indication message from the secondary base station through an X2 interface. The controller may determine whether to apply an overload reduction action for the secondary base station based on a value of the secondary base station load information parameter included in the secondary base station status indication message.

For example, the master base station 2000 may establish the dual connectivity with the secondary base station for a UE. For example, the master base station 2000 may be an eNB employing the LTE radio access technology, and the secondary base station configured with the dual connectivity with the eNB for the UE may be a gNB employing the NR radio access technology. As another example, the master base station 2000 may be a gNB employing the NR radio access technology, and the secondary base station configured with the dual connectivity with the gNB for the UE may be an eNB employing the LTE radio access technology. As further another example, the master base station 2000 and the secondary base station may be base stations employing an identical radio access technology.

The secondary base station status indication message may be periodically received. The transmission of the secondary base station status indication message may be triggered by the secondary base station when a preset condition is satisfied. The receiver 2030 may receive the secondary base station status indication message by the transmission of the secondary base station in response to a request of the master base station 2000.

The secondary base station status indication message may include a message-type parameter and a secondary base station load information parameter. The message-type parameter may include a unique value specifying a procedure of a corresponding message, and an identical message-type parameter is used in an identical procedure. The secondary base station load information parameter may include either a value indicating an overload or a value indicating a non-overload.

For example, when the secondary base station is in an overload status, the secondary base station load information parameter may be set to the value indicating the overload (e.g., overloaded). When the secondary base station is in a normal status (not in the overload status), the secondary base station load information parameter may be set to the value indicating the non-overload (e.g., not-overloaded). When needed, the secondary base station load information parameter may be set to values indicating other statuses in addition to the above two values.

When the secondary base station status indication message is received, the controller 2010 checks the value of the secondary base station load information parameter. When the secondary base station load information parameter has been set to a value indicating the overload of the secondary base station, the controller 2010 may determine to trigger the overload reduction action for the secondary base station. When the secondary base station load information parameter has been set to a value indicating the non-overload of the secondary base station, the controller 2010 dose not trigger the overload reduction action for the secondary base station.

The overload reduction action may be set variously by base station operators, and embodiments of the present disclosure are not limited to any specific action. For example, the overload reduction action may be an action reducing an amount of data transmitted to the secondary base station. As another example, the overload reduction action may be an action limiting the number of dual connectivity radio bearers allocated to the secondary base station. As further another example, the overload reduction action may be an action deactivating or releasing dual connectivity establishment of the secondary base station.

Meanwhile, when the overload reduction action is determined to be triggered, the controller 2010 may keep applying the overload reduction action for the secondary base station until a secondary base station status indication message including the value indicating the non-overload is received.

In addition, a transmitter 2020 transmits, to the secondary base station, an X2 interface setup request message including a list of all or a part of serving cells of the master base station. The transmitter 2020 transmits the X2 interface setup request message for establishing dual connectivity to at least one candidate secondary base station to be configured with the dual connectivity for a UE. In this case, information on the list of all or a part of the serving cells provided by the master base station 2000 may be included in the X2 interface setup request message.

In addition, a receiver 2030 receives, from the secondary base station, an X2 interface setup response message including a list of all or a part of serving cells of the secondary base station. After the X2 interface setup request message is transmitted, the receiver 2030 receives, from the at least one candidate secondary base stations, the X2 interface setup response message including information on a list of all or a part of the serving cells of the at least one candidate secondary base station.

Thereafter, the controller 2010 determines a secondary base station to be configured with the dual connectivity for the UE based on the received X2 interface setup response message, controls configuration information needed to establish the dual connectivity to be transmitted to the secondary base station, and then establishes the dual connectivity.

In addition, the controller 2010 controls overall operations of the master base station 2000 needed for performing operations for secondary base station load management according to embodiments of the present disclosure.

Further, the transmitter 2020 and the receiver 2030 are used to transmit, to at least one other base station and a UE, or receive, from the at least one other base station and the UE, signals, messages, data required to perform embodiments described above.

Figure 21:
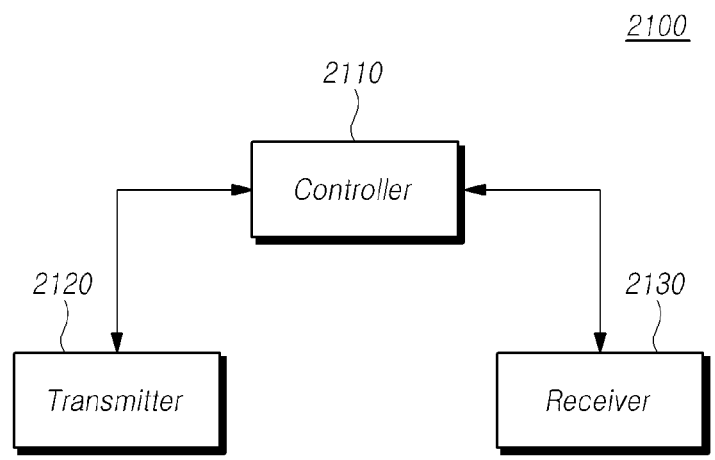
FIG. 21 is a block diagram illustrating a central unit according to an embodiment of the present disclosure.

FIG. 21 is a block diagram illustrating a central unit according to an embodiment of the present disclosure.

Referring to FIG. 21, a central unit 2100 for managing a load of a distributed unit may include i) a receiver 2130 receiving a distributed unit status indication message from the distributed unit through an F1 interface and ii) a controller 2110 determining whether to apply an action for reducing a load of the distributed unit based on a value of a distributed unit load information parameter included in the distributed unit status indication message.

Referring to FIG. 21, a base station may be configured with one central unit 2100 and one or more distributed units. The central unit 2100 is a node hosting radio resource control (RRC) and packet data convergence protocol (PDCP) of the base station. The distributed unit is a node hosting radio link control (RLC), medium access control (MAC) and physical (PHY) of the base station.

The receiver 2130 may periodically receive the distributed unit status indication message. The transmission of the distributed unit status indication message may be triggered by the distributed unit when a preset condition is satisfied. The central unit 2000 may receive the distributed unit status indication message by the transmission of the distributed unit in response to the request of the central unit 2000.

The distributed unit status indication message may include a message-type parameter, a transaction identification parameter and a distributed unit load information parameter. The message-type parameter indicates a type of a corresponding message. The transaction ID IE uniquely identifies a procedure among all ongoing parallel procedures of the same type initiated by the same protocol peer. Messages belonging to the same procedure shall use the same transaction ID. The transaction ID is determined by the initiating peer of a procedure.

The distributed unit load information parameter may include either a value indicating an overload or a value indicating a non-overload. For example, when the distributed unit is in an overload status, the distributed unit load information parameter may be set to the value indicating the overload (e.g., overloaded). When the distributed unit is in a normal status (not in the overload status), the distributed unit load information parameter may be set to the value indicating the non-overload (e.g., not-overloaded). When needed, the distributed unit load information parameter may be set to values indicating other statuses in addition to the above two values.

When the distributed unit status indication message is received, the controller 2110 checks the value of the distributed unit load information parameter. When the distributed unit load information parameter has been set to the value indicating the overload of the distributed unit, the controller 2110 may determine to trigger the overload reduction action for the distributed unit. When the distributed unit load information parameter has been set to the value indicating the non-overload of the distributed unit, the controller 2110 dose not trigger the overload reduction action for the distributed unit. The overload reduction action may be set variously by base station operators, and embodiments of the present disclosure are not limited to any specific operation. Meanwhile, when the overload reduction action is determined to be triggered, the controller 2110 may keep applying the overload reduction action for the distributed unit until a distributed unit status indication message including the value indicating the non-overload is received.

In addition, the controller 2110 controls overall operations of the central unit 2100 needed for performing operations for distributed unit load management according to embodiments of the present disclosure.

Further, a transmitter 2120 and the receiver 2130 are used to transmit/receive signals, messages, or data required to perform embodiments described above to/from the distributed unit, a core network entity, at least one other base station and a UE.

The embodiments described above may be supported by the standard documents disclosed in at least one of the wireless access systems IEEE 802, 3GPP and 3GPP2. That is, the steps, configurations, and parts not described in the present embodiments for clarifying the technical idea may be supported by standard documents described above. In addition, all terms disclosed herein may be described by the standard documents described above.

The embodiments described above may be implemented by various means. For example, the embodiments of the present disclosure may be implemented by hardware, firmware, software, or a combination thereof.

In the case of hardware implementation, the method according to embodiments may be implemented by one or more of application specific integrated circuits (ASICs), digital signal processors (DSPs), digital signal processing devices (DSPDs), programmable logic devices (PLDs) (Field Programmable Gate Arrays), a processor, a controller, a microcontroller, a microprocessor, or the like.

In the case of an implementation by firmware or software, the method according to the embodiments may be implemented in the form of an apparatus, a procedure, or a function for performing the functions or operations described above. The software code may be stored in a memory and driven by the processor. The memory may be located inside or outside of the processor, and may transmit data to the processor or receive data from the processor by various well-known means.

The terms "system", "processor", "controller", "component", "module", "interface", "model", "unit", or the like described above may generally refer to computer-related entity hardware, a combination of hardware and software, software, or running software. For example, such elements described above may be, but not limited to, a process driven by the processor, a control processor, an entity, a running thread, a program and/or a computer. For example, when an application runs on a controller or a processor, all of the application, the controller or the processor can become one element. One or more elements may be included in a processor and/or a running thread, and the elements may be located on one device (e.g., a system, a computer device, etc.) or located distributedly two or more devices.

The forgoing has been presented to best explain the embodiments and examples and thereby to enable any person skilled in the art to make and use the invention as claimed. Various modifications, additions and substitutions to the described embodiments and examples will be readily apparent to those skilled in the art without departing from the spirit and scope of the present disclosure. The specific embodiments and examples described herein are to be understood as particularly graceful implementations of the claimed invention in an effort to illustrate rather than limit technical principles of the present disclosure. Thus, the breadth and scope of the present disclosure should not be limited by any of the above-described embodiments and examples. Rather, the scope of protection of the present disclosure should be construed based on the following claims, and all technical ideas or principles within the scope of equivalents thereof should be construed as being included within the scope of the present disclosure.

What is claimed is:

1. A method of a master base station for managing a load of a secondary base station, the method comprising:
    establishing dual connectivity with the secondary base station;
    receiving a secondary base station status indication message from the secondary base station through an X2 interface; and
    determining by the master base setation, whether to apply an overload reduction action for the secondary base station based on a value of a secondary base station load information parameter included in the secondary base station status indication message,
    wherein the secondary base station load information parameter includes either a value indicating an overload or a value indicating a non-overload, and
    wherein the master base station and the secondary base station employ different radio access technologies from each other, and the master base station is connected to a core network via a control plane and a user plane, while the secondary base station is connected to the core network via the user plane only.

2. The method according to claim 1, wherein the establishing of the dual connectivity comprises:
    transmitting, to the secondary base station, an X2 interface setup request message including a list of all or a part of serving cells of the master base station; and
    receiving, from the secondary base station, an X2 interface setup response message including a list of all or a part of serving cells of the secondary base station.

3. The method according to claim 1, wherein the determining whether to apply the overload reduction action for the secondary base station comprises:
    determining whether the overload reduction action is triggered for the secondary base station when the secondary base station load information parameter includes the value indicating the overload; and
    when the overload reduction action is triggered, continuing to apply, by the master base station, the overload reduction action for the secondary base station until the secondary base station status indication message including the value indicating the non-overload is received.

4. A master base station for managing a load of a secondary base station, the master base station comprising:
    a controller configured to establish dual connectivity with the secondary base station; and
    a receiver configured to receive a secondary base station status indication message from the secondary base station through an X2 interface,
    wherein the controller of the master base station determines whether to apply an overload reduction action for the secondary base station based on a value of a secondary base station load information parameter included in the secondary base station status indication message,
    wherein the secondary base station load information parameter includes either a value indicating an overload or a value indicating a non-overload, and
    wherein the master base station and the secondary base station employ different radio access technologies from each other, and the master base station is connected to a core network via control plane and user plane, while the secondary base station is connected to the core network via the user plane only.

5. The master base station according to claim 4, further comprising a transmitter configured to transmit, to the secondary base station, an X2 interface setup request message including a list of all or a part of serving cells of the master base station,
    wherein the receiver receives, from the secondary base station, an X2 interface setup response message including a list of all or a part of serving cells of the secondary base station.

6. The master base station according to claim 4, wherein the controller determines whether the overload reduction action is triggered for the secondary base station when the secondary base station load information parameter includes the value indicating the overload,
    wherein when the overload reduction action is triggered as the determination result, the master base station continues to apply the overload reduction action for the secondary base station until the secondary base station status indication message including the value indicating the non-overload is received.

7. A method of a central unit of a master base station for managing a load of a distributed unit, the method comprising:
    receiving a distributed unit status indication message from the distributed unit through an F1 interface; and
    determining, by the central unit of the master base station, whether to apply an overload reduction action for the distributed unit based on a value of a distributed unit load information parameter included in the distributed unit status indication message,
    wherein the distributed unit load information parameter includes either a value indicating an overload or a value indicating a non-overload,
    wherein the master base station includes the central unit and one or more of the distributed units,
    wherein the central unit is a logical node hosting radio resource control (RRC) and packet data convergence protocol (PDCP) of the base station, and the distributed unit is a logical node hosting radio link control (RLC), medium access control (MAC) and physical (PHY) of the base station, and
    wherein the determining whether to apply the overload reduction action for the distributed unit comprises:
    determining whether the overload reduction action is triggered for the distributed unit when the distributed unit load information parameter includes the value indicating the overload; and
    when the overload reduction action is triggered based on the determination result, continuing to apply, by the central unit, the overload reduction action for the distributed unit until the distributed unit status indication message including the value indicating the non-overload is received.

8. The method according to claim 7, wherein the distributed unit status indication message includes a message-type parameter, a transaction identification parameter and a distributed unit load information parameter.

* * * * *